(12) United States Patent
Sauti et al.

(10) Patent No.: US 11,097,440 B2
(45) Date of Patent: Aug. 24, 2021

(54) CUTTING MECHANISM FOR CARBON NANOTUBE YARNS, TAPES, SHEETS AND POLYMER COMPOSITES THEREOF

(71) Applicant: U.S.A, as represented by the Administrator of the National Aeronautics and Space Administration, Washington, DC (US)

(72) Inventors: Godfrey Sauti, Hampton, VA (US); Jae-Woo Kim, Newport News, VA (US); Emilie J. Siochi, Newport News, VA (US); John M. Gardner, Newport News, VA (US)

(73) Assignee: UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 364 days.

(21) Appl. No.: 15/530,055

(22) Filed: Nov. 7, 2016

(65) Prior Publication Data
US 2017/0129182 A1    May 11, 2017

Related U.S. Application Data

(60) Provisional application No. 62/251,372, filed on Nov. 5, 2015.

(51) Int. Cl.
| | | |
|---|---|---|
| *B26F 3/08* | (2006.01) | |
| *B29C 64/209* | (2017.01) | |
| *B29C 64/30* | (2017.01) | |
| *B29C 64/118* | (2017.01) | |
| *B29K 105/16* | (2006.01) | |
| *B29K 507/04* | (2006.01) | |

(52) U.S. Cl.
CPC .............. *B26F 3/08* (2013.01); *B29C 64/118* (2017.08); *B29C 64/209* (2017.08); *B29C 64/30* (2017.08); *B29K 2105/167* (2013.01); *B29K 2507/04* (2013.01); *B29K 2995/0005* (2013.01)

(58) Field of Classification Search
CPC .... B41C 1/141; B26F 3/08; B26F 3/10; B26F 3/12; B26F 3/06
See application file for complete search history.

(56) References Cited

U.S. PATENT DOCUMENTS

| 2,356,841 A | 8/1944 | Gregory |
|---|---|---|
| 2,544,673 A | 3/1951 | Bernard |

(Continued)

OTHER PUBLICATIONS

Iijima, Sumio, "Hellcal Microtubules of Graphitic Carbon", Letter to Nature, Nov. 7, 1991, pp. 56-58, vol. 354.

(Continued)

*Primary Examiner* — Jacob T Minskey
*Assistant Examiner* — S. Behrooz Ghorishi
(74) *Attorney, Agent, or Firm* — Jennifer L. Riley; Robin W. Edwards; Helen M. Galus

(57) ABSTRACT

A cutting mechanism includes electrodes that are utilized to cut or score a non-conductive outer material of a filament or sheet. The electrodes contact a conductive reinforcing material of the filament or sheet to complete an electric circuit. Electric current flows through and heats the conductive material to oxidize or otherwise separate/cut the conductive material and any remaining non-conductive material.

17 Claims, 14 Drawing Sheets

(56) References Cited

U.S. PATENT DOCUMENTS

| | | | |
|---|---|---|---|
| 2,871,622 A | 2/1959 | Edward et al. | |
| 3,740,517 A * | 6/1973 | Lauer | B23K 11/22 219/68 |
| 3,763,561 A | 10/1973 | Scharfenberger | |
| 4,169,398 A | 10/1979 | Wadsworth et al. | |
| 4,248,114 A | 2/1981 | Alexander et al. | |
| 4,557,049 A | 12/1985 | Cribbs et al. | |
| 4,916,278 A * | 4/1990 | Rudd | B23D 31/00 148/194 |
| 4,984,727 A | 1/1991 | Jimenez | |
| 5,044,235 A | 9/1991 | Lehner | |
| 5,121,329 A | 6/1992 | Crump | |
| 5,176,028 A | 1/1993 | Humphrey | |
| 5,429,163 A * | 7/1995 | Frenkel | B26D 7/10 144/2.1 |
| 5,448,186 A | 9/1995 | Kawata | |
| 5,500,505 A | 3/1996 | Jones | |
| 5,873,291 A | 2/1999 | Sand | |
| 6,282,950 B1 | 9/2001 | Taylor, Jr. | |
| 6,518,330 B2 | 2/2003 | White et al. | |
| 6,735,870 B2 | 5/2004 | Sand | |
| 6,934,600 B2 | 8/2005 | Jang | |
| 7,137,761 B2 | 11/2006 | Hara et al. | |
| 7,297,304 B2 | 11/2007 | Swanson et al. | |
| 7,799,849 B2 | 9/2010 | Raravikar et al. | |
| 8,221,669 B2 | 7/2012 | Batchelder | |
| 8,347,723 B2 | 1/2013 | Questo et al. | |
| 8,452,073 B2 | 5/2013 | Taminger et al. | |
| 2003/0236588 A1* | 12/2003 | Jang | B82Y 30/00 700/119 |
| 2005/0120846 A1* | 6/2005 | Ellner | B26D 7/10 83/171 |
| 2009/0294022 A1 | 12/2009 | Hayes et al. | |
| 2012/0036977 A1 | 2/2012 | Vaniglia | |
| 2013/0233471 A1 | 9/2013 | Kappesser et al. | |
| 2013/0255084 A1 | 10/2013 | Hasegawa et al. | |
| 2014/0061974 A1 | 3/2014 | Tyler | |
| 2014/0249773 A1 | 9/2014 | Beuth, Jr. | |
| 2014/0268604 A1 | 9/2014 | Wicker et al. | |
| 2014/0291886 A1* | 10/2014 | Mark | B29C 64/118 264/163 |
| 2015/0044383 A1 | 2/2015 | Kim | |
| 2015/0108677 A1 | 4/2015 | Mark et al. | |
| 2015/0165666 A1* | 6/2015 | Butcher | B29C 47/0014 428/373 |

OTHER PUBLICATIONS

Dresselhaus Mildred S. et al., Carbon Nanotubes Synthesis, Structures, Properties and Applications (T. W. Ebbesen, Ed 1991) Chapter 2, Relation of Carbon Nanotubes to Other Carbon Materials, Graphite p. 14; Chapter 3, Nanotube Growth and Characterization, p. 29 and Chapter 6, Electronic Properties and Defects, p. 118.
Koratkar, Nikhil A. et al., "Multifunctional Structural Reinforcement Featuring Carbon Nanotube Films", Compos. Sci. and Technol. (2003) pp. 1525-1531, vol. 63.
Atkinson, Ken R. et al., "Multifunctional Carbon Nanotube Yarns and Transparent Sheets: Fabrication, Properties, and Applications", Physica B (2007) pp. 339-343, vol. 394.
Qiu, Jingjing et al., "Carbon Nanotube Integrated Multifunctional Multiscale Composites", Nanotechnology (2007) pp. 1-11, vol. 18, 275708.
Kaemogebm M. et al., Multifunctional Carbon Nanotube for Fuel Cells, Appl. Phys. Lett. (2008) pp. 094103-1-094103-3, vol. 92, 094103.
Lee, Woo Il et al., Microwave Curing of Composites, J. Comps. Mater (1984) 387-409, vol. 18, Technomic Publishing Co.
Dresselhaus, M. S. et al., "Physics of Carbon Nanotubes", (1995) Carbon, pp. 883-891, vol. 33, No. 7.
Park, Cheol et al., "Dispersion of Single Wall Carbon Nanotubes by in Situ Polymerization Under Sonication", Chem. Phys. Lett. (2002) pp. 303-308, vol. 364.
Thostenson, E. T. et al., "Processing-structure-multi-functional Property Relationship in Carbon Nanotube/epoxy Composites", (2006) Carbon, pp. 3022-3029 vol. 44.
Ma, Peng-Cheng et al., "Dispersion and Functionalization of Carbon Nanotubes for Polymer-based Nanocomposites: A Review", Composites Part A (2010) pp. 1345-1367, vol. 41.
De Volder, Michael F. L. et al. "Carbon Nanotubes: Present and Future Commercial Applications", Science (2013) pp. 535-539, vol. 339.
Gurau, Michael, "Part 2: The world's First Commercial All-CNT Sheets, Tape and Yarns", archived at http://www.nanocomptech.com/blog/need-to-know-part-2-sheets-tape-yarn, accessed Apr. 17, 2016.
Qunfeng, Cheng et al., "High mechanical performance composite conductor: multi-walled carbon nanotube sheet/bismaleimide nanocomposites", Adv. Funct. Mater. (2009) pp. 3219-3225, vol. 19.
Qunfeng, Cheng et al., "Functionalized Carbon-Nanotube Sheet/ Bismaleimide Nanocompoites. Mechanical and Electrical Performance Beyond Carbon-Fiber Composites", Small (2010) pp. 763-767, vol. 6.
Kim, Jae-Woo et al., "Polyaniline/carbon Nanotube Sheet Nancomposites: Fabrication and Characterization", ACS Appl. Mater. Interfaces (2013) pp. 8597-8606, vol. 5.
Kim, Jae-Woo et al., "Toward High Performance Thermoset/Carbon Nanotube Sheet Nancomposites via Resistive Heating Assisted Infiltration and Cure", ACS Appl. Mater. Interfaces (2014) pp. 18832-18843, vol. 6.
Downs, Rebekah et al., "Strain-Induced Alignment Mechanisms of Carbon Nanotube Networks", Adv. Eng. Mater. (2015) pp. 349-356, vol. 17.
Harvey, Stefanie E., "Carbon as Conductor: A Pragmatic Review", Proceedings of the 61st IWCS Conference (2013) pp. 558-562.
Behabtu, Natnael et al., "Strong, Light, Multifunctional Fibers of Carbon Nanotube with Ultrahigh Conductivity", Science (2013) pp. 182-186, vol. 339.
Bak, David, "Rapid Prototyping of Rapid Production? 3D Printing Processes Move Industry Towards the Latter", Assembly Automation (2003) pp. 340-345, vol. 23.
Jones, Rhys. et al., "RepRap-the Replicating Rapid Prototyper", Robotica (2011) pp. 177-191, vol. 29.
Espalin, D. et al., "3D Printing Multifunctionality: Structures with Electronics", Int. J. Adv. Manuf. Technol, (2014) pp. 963-978, vol. 72.
Tymrak, B. M. et al., "Mechanical Properties of Components Fabricated with Open-source 3-D Printers Under Realistic Environmental Conditions", Materials & Design (2014) pp. 242-246, vol. 58.
Garcia-Tunon, E. et al., "Printing in Three Dimensions with Graphene", Adv. Mater. (2015) pp. 1688-1693, vol. 27.
Kim, J. H. et al, 3D Printing of Reduced Graphene Oxide Nanowires, Adv. Mater. (2015) pp. 157-161, vol. 27.
Nikzad, M. et al, "Thermo-mechanical Properties of a Highly Filled Polymeric Composites for Fused Deposition Modeling", Materials & Design (2011) pp. 3448-3456, vol. 32.
Walker, Brett S et al., "Reactive Silver Inks for Pattering High-conductivity Features at Mild Temperatures". J. Am. Chem. Soc. (2012) pp. 1419-1421, vol. 134.
Campbell, Thomas A., et al., "The Next Wave: 4D Printing Programming the Material World", Brent Scowcroft Center on International Security Report, Atlantic Council (2014) pp. 1-18.
Meng, Fancheng et al., "Electro-Induced Mechanical and Thermal Responses of Carbon Nanotube Fibers", Adv. Mater. (2014) pp. 2480-2485, vol. 26.
Namiki, M. et al., "3D Printing of Continuous Fiber Reinforced Plastic", SAMPE Conf. Proc., (2014) pp. 59-4328.
Dresselhaus, M. S., Dresselhaus, G. and Saito, R., Pergamon "Physics of Carbon Nanotubes," Carbon vol. 33, No. 7, pp. 883-891, (1995).
Hoogenboom, R. et al., "Microwave-Assisted Polymer Synthesis: Recent Developments in a Rapidly Expanding Field of Research", Macromol. Rapid Commun., (2007) pp. 368-386, vol. 28.

(56) References Cited

OTHER PUBLICATIONS

Kumar, P. K.. et al., "Development of Infrared rRadiation Curing System for Fiber Reinforced Polymer Composites: An Experimental Investigation", Indian J. Eng. Mater. Sci. (2011) pp. 24-30, vol. 18.

Levy, A. et al., "Ultrasonic Welding of Thermoplastic Composites: a Numerical Analysis at the Mesoscopic Scale Relating Processing Parameters, Flow of Polymer and Quality of Adhesion", Int. J. Mater. Form. (2014) pp. 39-51, vol. 7.

Bayerl, T. et al., "The Heating of Polymer Composites by Electromagnetic Induction—A review", Composites, Part A, pp. 27-40 (2014), vol. 57.

Kim, Jae-Woo et al., "Toward High Performance Thermoset/Carbon Nanotube Sheet Nanocomposites via Resistive Heating Assisted Infiltration and Cure", ACS Appl. Mater. Interfaces (2014) pp. 8832-18843, vol. 6.

Soylemez, Emrecan et al., "Controlling Melt Pool Dimensions Over a Wide Range of Material Deposition Rates in Electron Beam Additive Manufacturing", Solid Freeform Fabrication Conference (2010) pp. 571-582.

Vasinonta, Aditad et al., "Process Maps for predicting residual stress andmelt pool size in the laser—based fabrication of thin—walled structures," J. Manuf., Sci. Eng (2006) pp. 101-109, vol. 129(1).

Beuth, J. et al., "The Roles of process variables in laser—based direct metal solid freeform fabrication", N. JOM (2001) pp. 36-39, vol. 53.

Stiltner, Justin L. et al., "A Method for Creating Actuated Joints via Fiber Embedding in a Polyjet 3D Printing Process", 22nd Annual International Solid Freeform Fabrication Symposium, 2011, pp. 583-592.

Ge, QI et al., "Active materials by four-dimension printing," cited as Applied Physics Letters (2013) pp. 131901-1-1319015-5, vol. 103.

Wool, Richard P., "Self-healing Materials a Review", Soft Matter, 2008 pp. 400-418, vol. 4.

Liu, Ying et al., "Self-folding of Polymer Sheets Using Local Light Absorption", Soft Matter Feb. 14, 2012, pp. 1764-1769, vol. 8, No. 6.

Seufzer, William J., "Additive Manufacturing Modeling And Simulation", NASA/TM—2014-13 218245, pp. 1-23, Apr. 2014.

Beuth, Jack and Klingbeil, "The Role of Process Variables in Laser-Based Direct Metal Solid Freeform Fabrication", JOM, Sep. 2001, pp. 36-39.

* cited by examiner

CUTTING MECHANISM FOR CARBON NANOTUBE YARNS, TAPES, SHEETS AND POLYMER COMPOSITES THEREOF

CROSS-REFERENCE TO RELATED PATENT APPLICATION(S)

This patent application claims the benefit of and priority to U.S. Provisional Patent Application No. 62/251,372, filed on Nov. 5, 2015 and titled "CUTTING MECHANISM FOR CARBON NANOTUBE YARNS, TAPES, SHEETS AND POLYMER COMPOSITES THEREOF," the entire contents of which is hereby incorporated by reference in its entirety.

STATEMENT REGARDING FEDERALLY SPONSORED RESEARCH OR DEVELOPMENT

The invention described herein was made in the performance of work under a NASA contract and by an employee of the United States Government and is subject to the provisions of Public Law 96-517 (35 U.S.C. §202) and may be manufactured and used by or for the Government for governmental purposes without the payment of any royalties thereon or therefore. In accordance with 35 U.S.C. §202, the contractor elected not to retain title.

FIELD OF THE INVENTION

The present invention relates to the use of high strength/tough carbon nanotube fibers and polymer composites, and more particularly, to an improved apparatus for cutting resin coated carbon assemblages such as fibers and sheets.

BACKGROUND OF THE INVENTION

Fiber reinforced composites have been utilized in various applications including aerospace, automotive, and high performance sporting goods. Typically, the reinforcement or composite must be cut during processing. In particular, additive manufacturing processes of continuous fiber reinforced composites may utilize automated cutting of the polymer matrix and reinforcement.

A number of devices for cutting filaments have been developed. For example, Mark et al. WIPO Patent Application WO2014/153535 discloses cutting a fiber using a hot or cold knife. Jimenez U.S. Pat. No. 4,984,727, discloses a device for cutting textile filaments. Scharfenberger U.S. Pat. No. 3,763, 561 discloses a device for cutting materials such as glass roving. Becker U.S. Pat. No. 4,538,490 discloses a staple fiber cutter. Jones U.S. Pat. No. 5,500,505 which provides a method for cutting epoxy/carbon fiber composites with lasers. Alexander et al. U.S. Pat. No. 4,248,114 which provides an improved apparatus for cutting filamentary tows with a cutting assembly including a plurality of spaced apart knife edges. Sand U.S. Pat. No. 5,873,291 discloses an apparatus having a rotary cutter including a number of knives for cutting fibrous reinforcement material. Nordlin U.S. Pat. No. 6,735,870, Cribbs et al. U.S. Pat. No. 4,557, 049, and Hasegawa US Patent Application 2013/0255084 disclose cutters for optical fibers. Viniglia US Patent Application 2012/0036977 discloses a motorized head for applying composite material to an application surface. The apparatus includes a cutter and a shear surface for the cutter blade. Lehner U.S. Pat. No. 5,044,235 discloses a filament cutting machine system including a cutter ram and blades. Wadsworth et al. U.S. Pat. No. 4,169,398 discloses an apparatus for cutting filamentary material using knife blades against which a material to be cut is wound and then severed by applied pressure. Singer U.S. Pat. No. 2,871,622 discloses an apparatus for severing a length of continuously moving frangible filament into short lengths using a rotating scoring tool. Gregory U.S. Pat. No. 2,356,841 discloses a method for cutting tapered filaments using an electrically-controlled knife. Heffelfinger U.S. Pat. 2,821,253 which provides a fiber cutter that includes a rotatable cutter head or disc with at least one cutting blade attached thereto, and a stationary blade which cooperates with the rotating blades to shear off the fiber or filament supply in a scissor-like manner.

Although numerous devices for cutting fibers and fiber composites have been developed, known devices may suffer from various drawbacks.

BRIEF SUMMARY OF THE INVENTION

Carbon nanotubes (CNTs) show promise as multifunctional materials for a range of applications due to their outstanding combination of mechanical, electrical and thermal properties. The measured elastic moduli for CNTs typically range from 1.28 to 1.8 TPa. CNTs have exhibited breaking strengths ranging from 11 to 63 GPa and failure strain of 1.6% under a tensile load. These properties of CNTs make them an ideal reinforcement material for additive manufacturing and other processing. However, the high strength of the CNT reinforcements such as yarns, tapes and sheets makes them very difficult to cut. Continuous CNT reinforced materials typically cannot be readily cut by blades, ultrasonic cutters or shears. The mechanism described herein takes advantage of the electrical, thermal and chemical properties of CNTs and/or other electrically conductive materials to provide a robust cutting method.

One aspect of the present disclosure is a filament cutter that includes a set of blades to score through resin coatings that may be present on the fibers. The filament cutter also utilizes an electrical current to heat and cut the fiber reinforcement and any remaining resin.

The present disclosure provides a filament cutter mechanism and process for cleanly cutting high strength/toughness fibers and polymer fiber composites with minimal blade wear. The filament cutter may be used as part of an additive manufacturing device/process. The filament cutter is fast, compact and requires relatively low power.

The filament cutting mechanism described herein utilizes the electrical conductivity and chemistry of composites to provide a way to effect clean and precise cuts utilizing a low amount of energy. It will be understood that an electrically conductive filament may comprise virtually any conductive filament, including (but not limited to) combinations of one or more of the following: (1) An electrically conductive core with an insulating coating; (2) An insulating matrix doped with electrically conductive fibers and/or particles; and/or (3) An insulating core surrounded by an electrically conductive fiber.

In a process according to the present disclosure, a set of electrically conductive (e.g. metal) blades are connected to an electrical power supply and act as electrodes. The blades are used to isolate a region of the filament to be cut. The blades score and degrade (penetrate) any resin coating on the reinforcement fiber, thereby causing the blades to come into contact with the electrically conductive material of the filament (e.g. carbon fiber), thereby completing an electrical circuit. This completion of the electrical circuit causes a surge of electrical current to flow through the conductive material of the filament in a small region between the blades, causing the conductive material (e.g. carbon fiber) of the filament therein to heat up rapidly.

When an electrical current I flows through conductive materials such as a fiber of electrical resistance R, the power ($P=I^2R$) is dissipated primarily as heat energy. In the case of carbon fibers, the rapid heating of a carbon containing fiber in an oxidizing atmosphere causes its oxidation via the reaction:

$$C + O_2 \rightarrow CO_2.$$

The rapid heating may also cause oxidation of any polymer that is on the fiber surface. Additionally, rapid heating also cause oxidation/vaporization of the carbon fiber and/or the polymer coating.

The products produced by the gaseous reaction drift away and a clean break (gap) is created in the fiber/composite material in between the blades. Because only a small part of the filament is heated, a relative low amount of electrical energy is required for the cut. Additionally, no shearing action is typically required to cut the fibers, thereby reducing or eliminating unintended damage to the fibers that could otherwise be caused by the blades. Still further, because the cutting is solely or in part the result of heating and oxidation rather than mechanical shearing, blade life is increased relative to conventional cutting processes.

These and other features, advantages, and objects of the present invention will be further understood and appreciated by those skilled in the art by reference to the following specification, claims, and appended drawings.

DETAILED DESCRIPTION OF THE INVENTION

Figure 1:
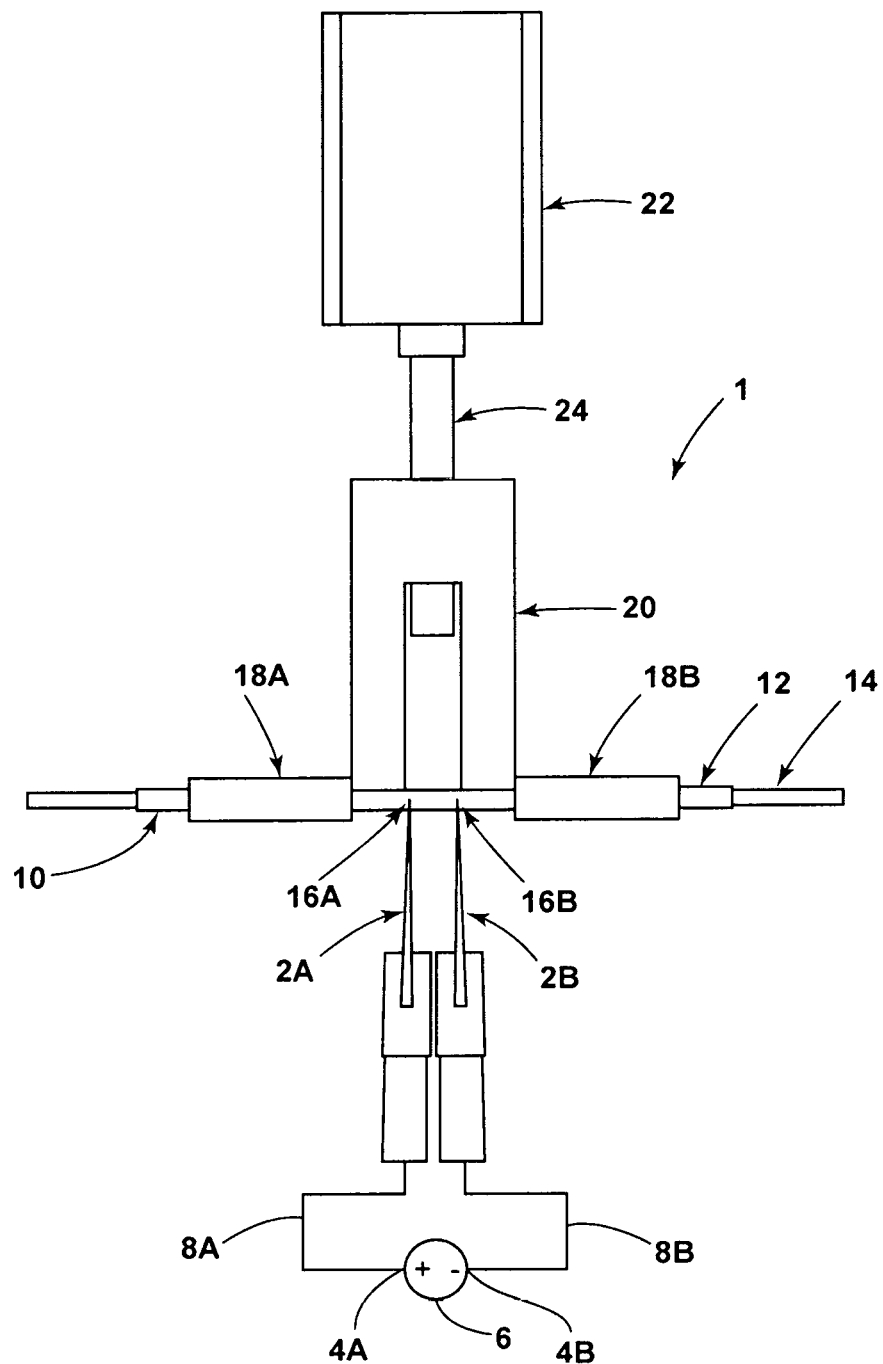
FIG. 1 is a top plan view of a cutting mechanism in which the blades/electrodes are adjacent to each other.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, a cutting mechanism 1 is configured to cut filament 10. Cutting mechanism 1 includes a pair of electrically conductive blades 2A, 2B that are electrically connected to positive and negative poles 4A, 4B of an electrical power supply 6 by conductors 8A, 8B. Blades/electrodes 2A, 2B are positioned adjacent to each other. Power supply 6 is chosen such that it is able to provide a large current spike when a conductive material such as continuous carbon nanotube (CNT) yarn, sheet or tape is presented across its terminals. Filament 10 may include a polymer coating 12 and a conductive reinforcement fiber 14. Filament 10 is guided in front of sharp edges 16A, 16B of the blades/electrodes 2A, 2B, respectively by a guide such as teflon sleeves 18A, 18B. The sharp edges 16A, 16B of the blades/electrodes 2A, 2B mechanically score/degrade polymer coating 12 on the filament 10 to ensure electrical contact between blades 2A, 2B and conductive fiber 14 for a subsequent electrical cutting step. The coated filament 10 is pressed against the edges 16A, 16B of blades 2A, 2B by a support block 20 that is driven towards blades 2A, 2B by a powered actuator such as electric motor 22 that is connected to support block 20 by a spindle 24.

Figure 2A:
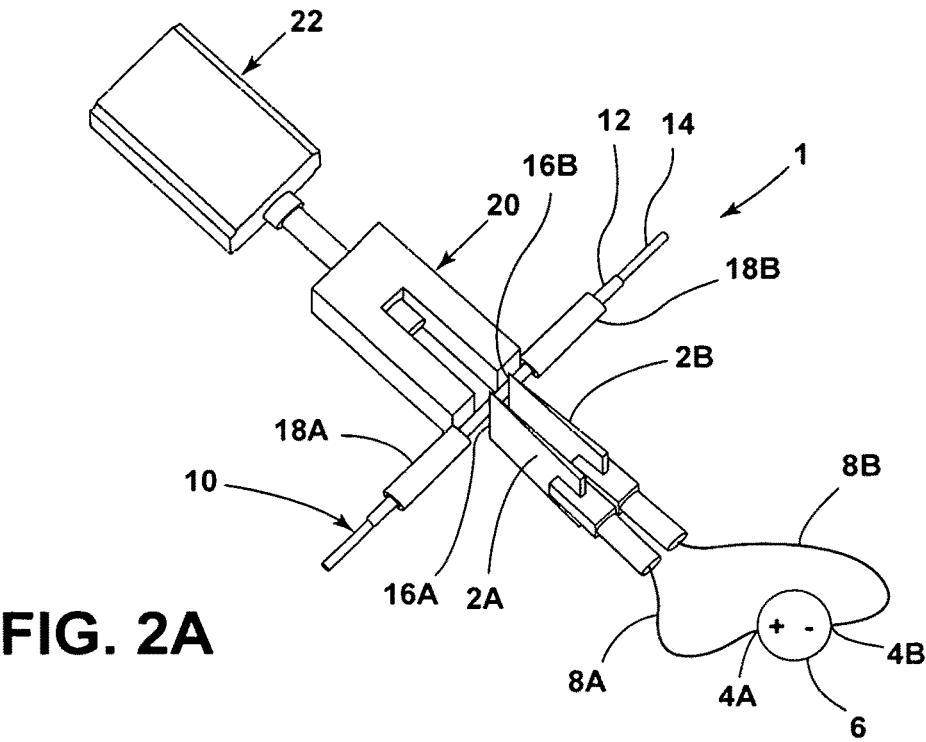
FIG. 2A is an isometric view of the cutting mechanism of FIG. 1 wherein the blades/electrodes are in a retracted configuration.
Figure 2B:
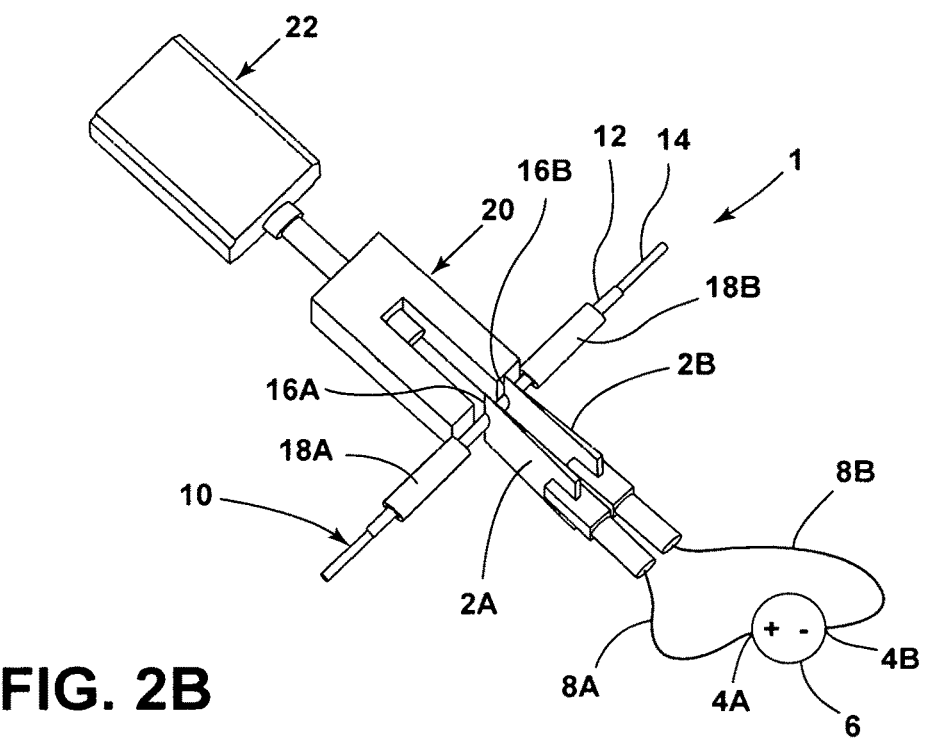
FIG. 2B is an isometric view of the cutting mechanism of FIG. 1 wherein the blades/electrodes are in an engaged configuration.

In use, electric motor 22 is actuated to shift the support block 20 from a retracted position (FIG. 2A) to an extended or engaged position (FIG. 2B). After cutting filament 10, electric motor 22 is actuated to shift the support block from the engaged position (FIG. 2B) to the retracted position (FIG. 2A). It will be understood that a powered actuator (e.g. electric motor 22) could be operably connected to the blades 2A, 2B and shift the blades 2A, 2B relative to support block 22.

Figure 3A:
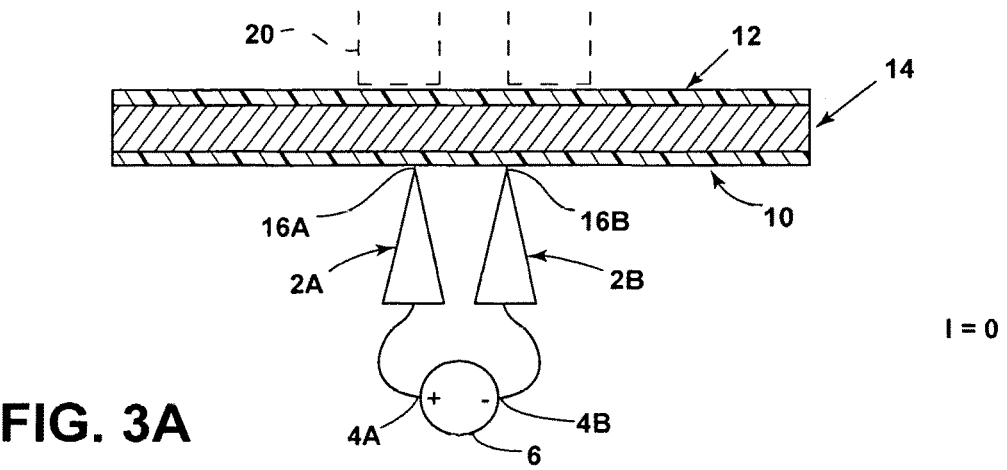
FIG. 3A is a schematic view of a portion of the cutting mechanism of FIG. 1 just prior to the cutting operation.
Figure 3B:
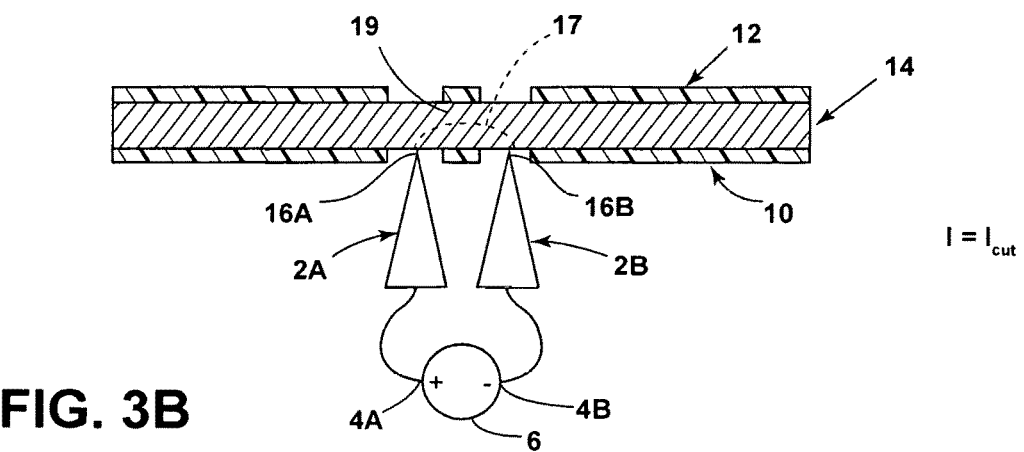
FIG. 3B is a schematic view showing scoring of a polymer coating during the cutting operation.
Figure 3C:
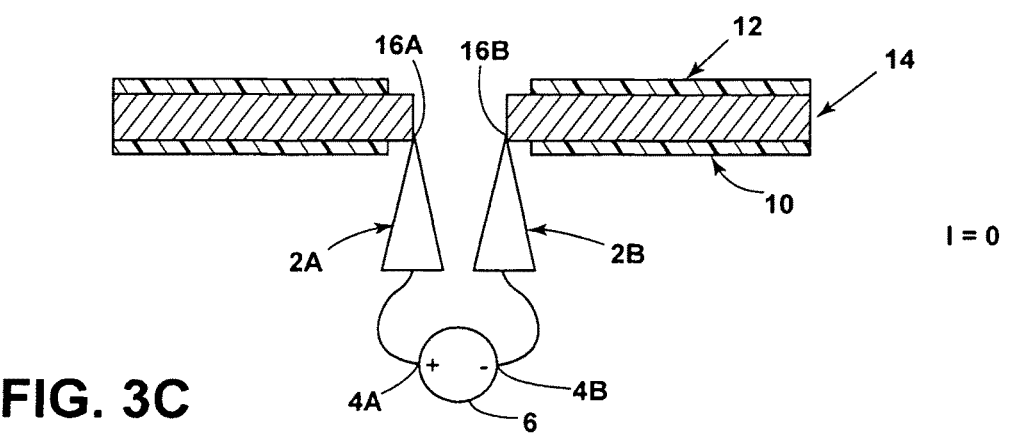
FIG. 3C is a schematic view showing the cut filament at the end of the cutting process.

FIGS. 3A-3C show the stages of the cutting operation of cutting mechanism 1. Initially, as shown in FIG. 3A, a coated filament 10 is presented (positioned) directly adjacent edges 16A, 16B of blades/electrodes 2A, 2B. At this point, no electrical current is flowing from the power supply 6 (I=0) because there is not a complete circuit. As the filament 10 is pressed against the blades/electrodes 2A, 2B by the support block 20 and electric motor 22, the coating 12 on the filament 10 is mechanically degraded (scored) and the edges 16A, 16B of blades/electrodes 2A, 2B come into contact with the electrically conductive core 14 (e.g. carbon nanotubes) of the filament 10 as shown in FIG. 3B. This causes an electrical current ($I_{cut}$) to flow through a local region 19 of the CNT-containing core 14 of the filament 10. The electrical current causes rapid and localized heating and oxidation of the CNT filament core 14 at region 19 between edges 16A, 16B of blades 2A, 2B. The current 17 also causes heating/oxidation of any coating 12 that was not previously removed by the mechanical action of the blades/electrodes 2A, 2B. The heat resulting from the electrical current causes cutting of the filament 12 as shown in FIG. 3C. Cutting the core 14 results in a break in the circuit that causes the current to return to zero.

Figure 4:
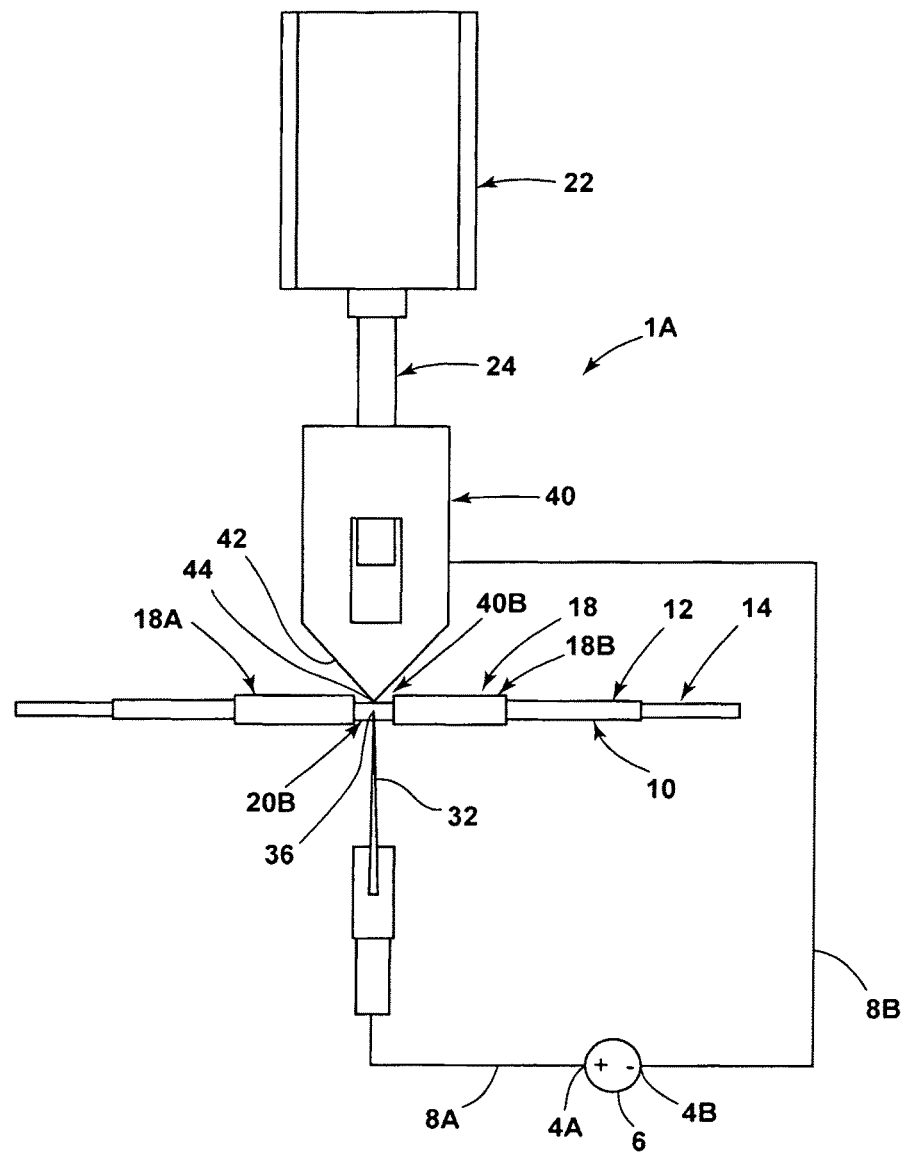
FIG. 4 is a top plan view of a cutting mechanism according to another aspect of the present disclosure in which the blades/electrodes face each other.
Figure 5A:
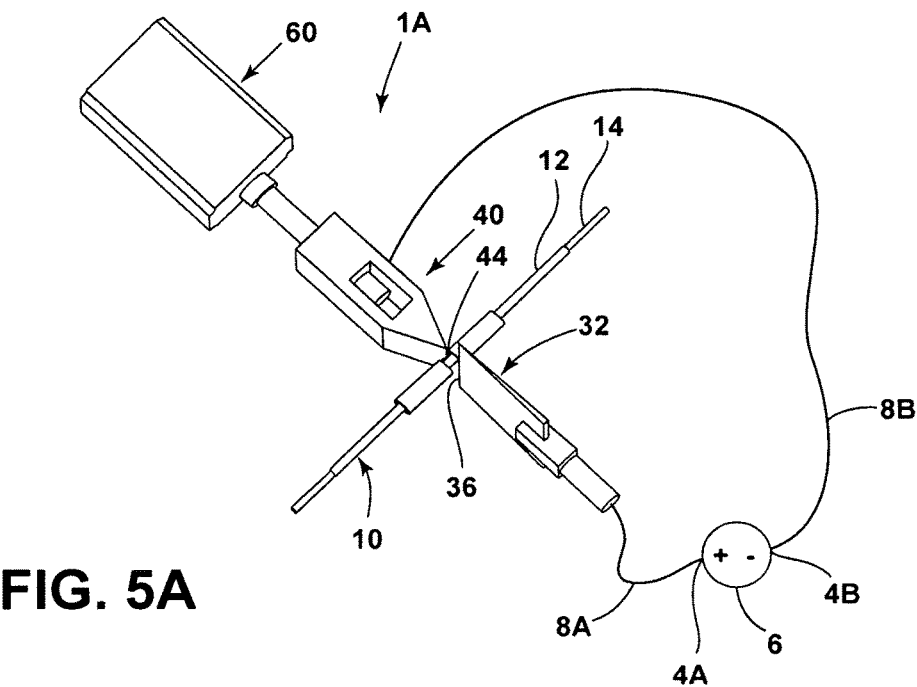
FIG. 5A is an isometric view of the cutting mechanism of FIG. 4 wherein the blades/electrodes are in a retracted configuration.
Figure 5B:
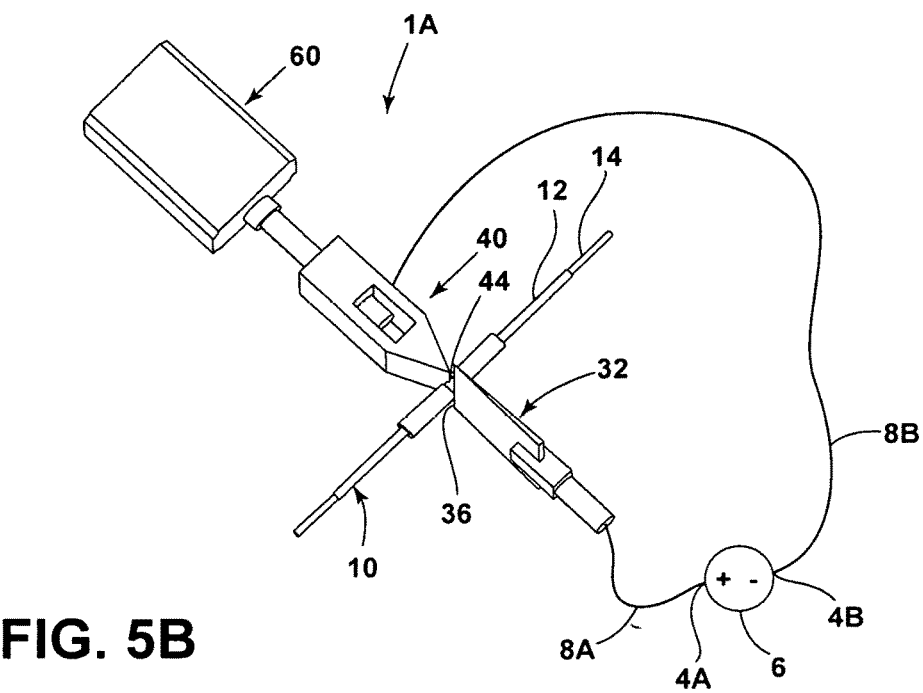
FIG. 5B is an isometric view of the cutting mechanism of FIG. 4 wherein the blades/electrodes are in an engaged configuration.

A cutting mechanism 1A according to another aspect of the present disclosure is shown in FIGS. 4, 5A, and 5B. Cutting mechanism 1A includes a blade 32 that is positioned opposite an edge or tip 44 of tapered end 42 of a support block 40. Edge 44 is preferably sharp enough to act as a blade to score polymer coating filament 10. Support block 40 can be shifted toward sharp edge 36 of blade 32 by electric motor 22. Support block 40 and cutting blade 32 are connected to opposite nodes 4A, 4B of electric power supply 6 such that support block 40 and blade 32 form electrodes that transmit electric current through conductive core 14 of filament 10 after tip 44 of support block 40 and edge 36 of blade 32 cut/score coating 12 of filament 10 and contact conductive core 14. Filament 10 includes a polymeric coating 12 and a conductive CNT core 14. The filament 10 is guided between the blades/electrodes 32 and 40 by a sleeve assembly 18. Sleeve assembly 18 includes first and second sleeve segments 18A and 18B. A shaft/spindle 24 and electric motor 22 provide mechanical force that causes edge 36 of blade 32 and tip 44 of support block 40 to degrade (e.g. deform/cut) the polymer coating 12 and ensure electrical contact between the electrodes formed by blade 32 and support block 40.

FIG. 5A shows the cutting mechanism 1A of FIG. 4 with the blade 36 and support block 40 in a retracted configuration. Actuation of electric motor 60 causes blade 36 and support block 40 to shift relative to one another to the engaged configuration of FIG. 5B.

Figure 6A:
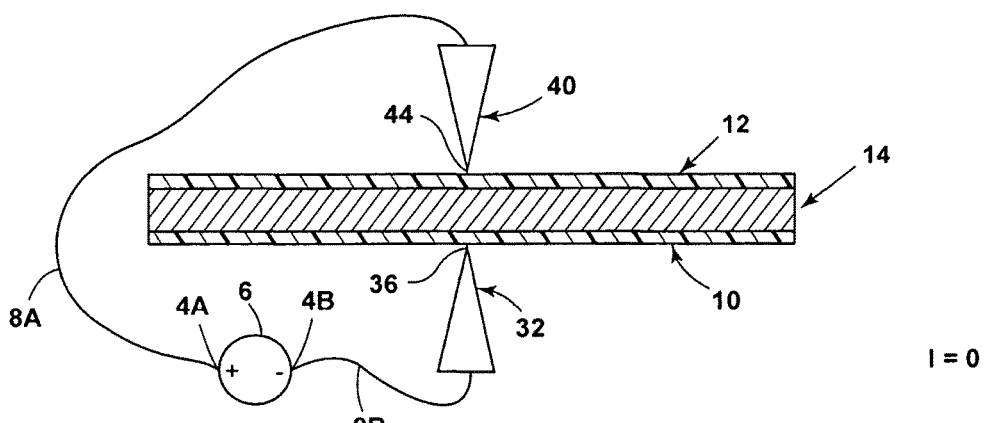
FIG. 6A is a schematic view showing initiation of the cutting process for the cutting mechanism of FIG. 4.
Figure 6B:
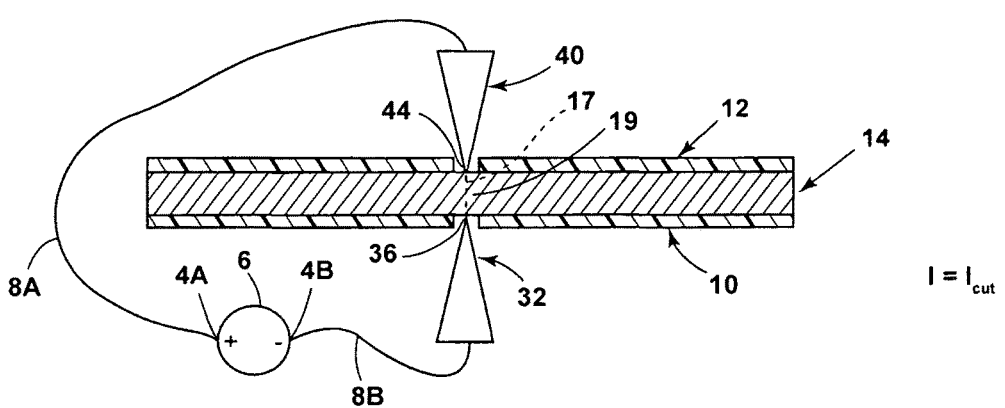
FIG. 6B is a schematic view showing the cutting process.
Figure 6C:
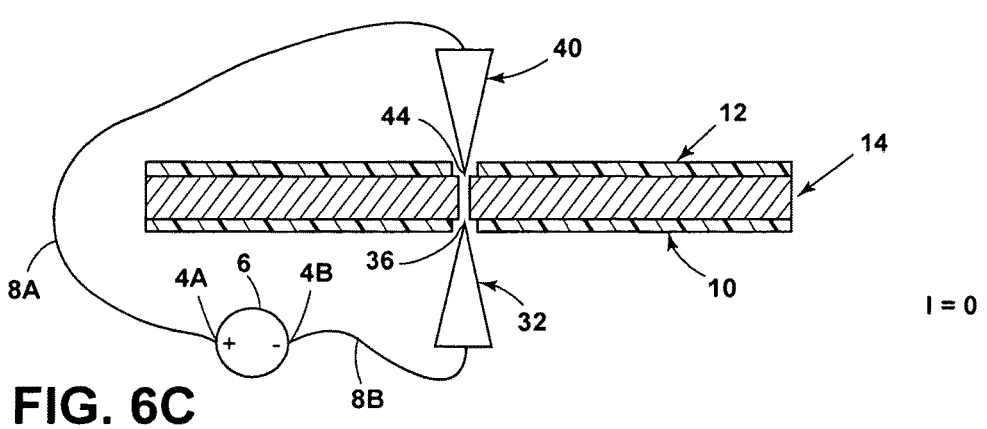
FIG. 6C is a schematic view showing separation of the filament at the end of the cutting process.

FIGS. 6A-6C show the stages of the cutting process for the cutting device 1A of FIGS. 4, 5A, 5B. As the filament 10 is initially pressed against the blades/electrodes 32, 40 (FIG. 6A) due to actuation of electric motor 22, polymeric coating 12 provides electrical insulation between conductive CNT core 14 and blades/electrodes 32, 40 such that no electric current flows through the blades/electrodes 32, 40. However, due to actuation of electric motor 60, the polymer coating 12 on the filament 10 is mechanically degraded (cut) as shown in FIG. 6B, and the edges 36, 44, of the blades/electrodes 32, 40 come into contact with the electrically conductive carbon nanotube core 14 of the filament 10. This causes an electrical current 17 to flow through a local region 19 of the CNT-containing core 14 of the filament 10. The electric current 17 causes rapid and localized heating and oxidation of region 19 of the CNT filament core 14 and any coating 12 that was not previously removed by the mechanical action of the blades/electrodes 36, 40. Heat resulting from the electric current causes the conductive core 14 to be cut, thus cutting the filament 10 as shown in FIG. 6C. The resulting break in the circuit causes the electrical current to return to zero.

It will be understood that other mechanical devices such as spring mechanisms, pneumatic devices and manual force (e.g. FIGS. 7A, 8A), may be used to provide the mechanical force to degrade (cut) the polymer coating 12 on the filament 10 and ensure electrical contact of the blades/electrodes with the conductive material for the electrical cutting portion of the process. Thus, the present disclosure is not limited to any particular actuator such as the electric motor 22 discussed above.

Figure 7A:
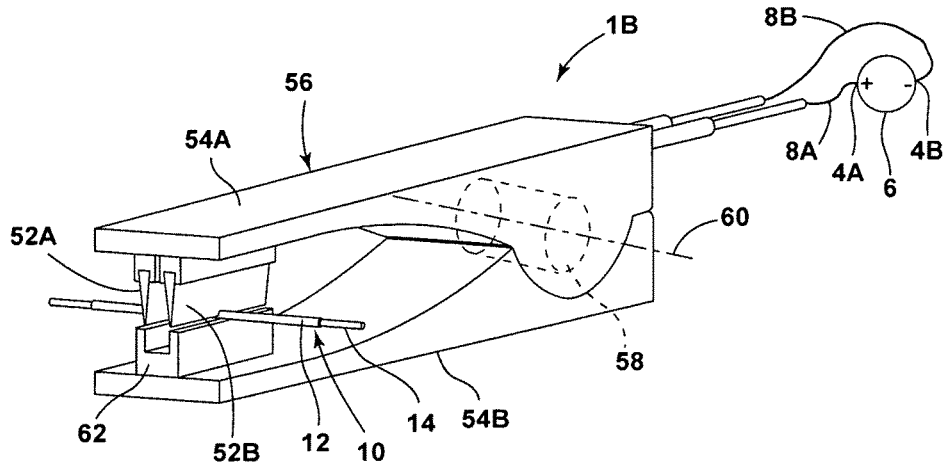
FIG. 7A is an isometric view of a cutting mechanism in which the mechanical motion of the blades is achieved manually, and wherein the blades are adjacent to each other.
Figure 7B:
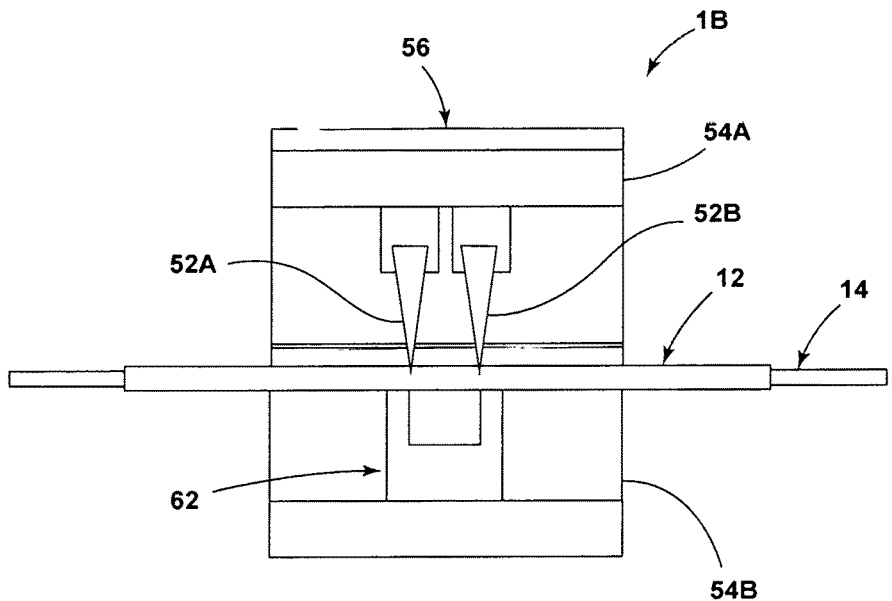
FIG. 7B is an end view of the manual cutting mechanism of FIG. 7A.

With further reference to FIGS. 7A and 7B, a manually-actuated cutting mechanism 1B according to another aspect of the present disclosure includes upper and lower jaws/handles 54A and 54B that are pivotably interconnected by a pin 58 or the like for relative rotation about an axis 60. Blades 52A, 52B are mounted to upper jaw 65A of a manual tool 56, and a U-shaped support block 62 is mounted to lower jaw 54B. Blades 52A, 52B are electrically connected to opposite nodes 4A, 4B of electrical power supply 6. Tool 56 may include a torsion spring (not shown) that biases jaws/handles 54A and 54B apart. A stop (not shown) may limit opening rotation of jaws/handles 54A and 54B.

In use, a user grasps handles/jaws 54A and 54B, and manually (i.e. by hand) applies a mechanical force to the handles/jaws 54A, 54B to push the blades 52A and 52B towards the support block 62. As blades/electrodes 52A, 52B are pressed into filament 10, degradation (cutting) of the coating 12 causes blades 52A and 52B to come into contact with electrically conductive core 14, thereby causing an electrical current to flow from the power supply 6 through core 14 to cut filament 10 due to heating/oxidation.

Figure 8A:
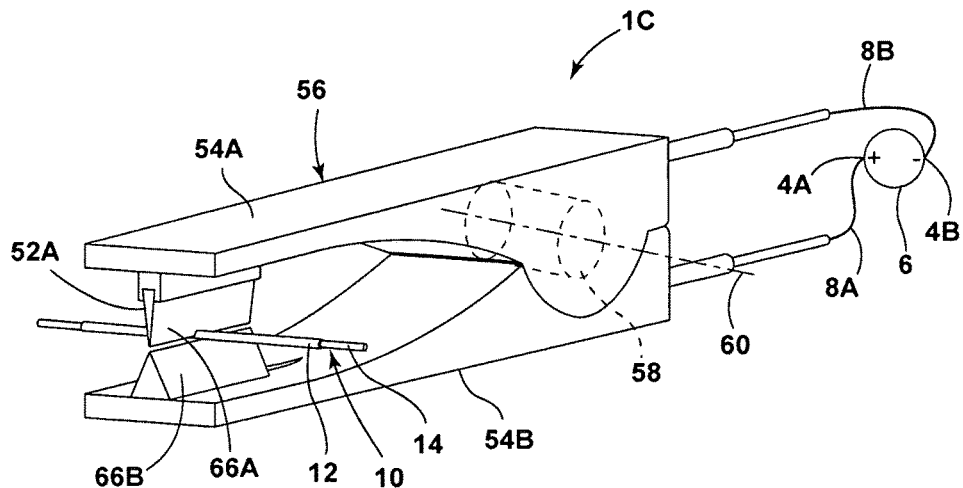
FIG. 8A is an isometric embodiment of a manual cutting mechanism in which the blades face each other.
Figure 8B:
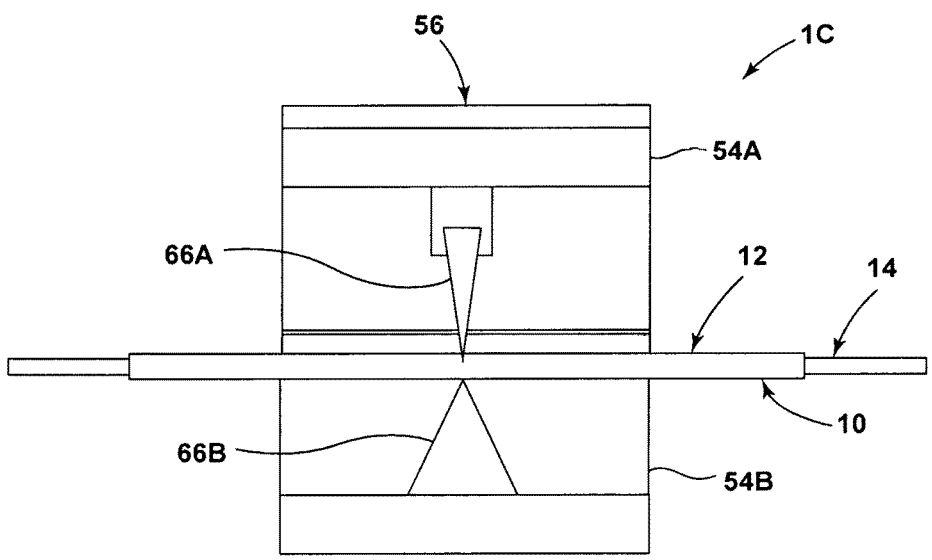
FIG. 8B is an end view of the manual cutting mechanism of FIG. 8A.

With reference to FIGS. 8A and 8B, a cutting mechanism 1C includes blades 66A, 66B that are mounted on jaws 54A, 54B, respectively of a manual tool 56. Blades 66A, 66B are electrically connected to opposite nodes 4A, 4B of electrical power supply 6. In use, a mechanical force is manually applied to the handles/jaws 54A, 54B. As the blades/electrodes 66A, 66B are pressed into filament 10, degradation (cutting) of the coating 12 causes blades/electrodes 66A, 66B to contract conductive core 14, thereby causing an electrical current to flow from the power supply 6 through conductive core 14 to thereby cut filament 10 due to heating/oxidation.

Figure 9A:
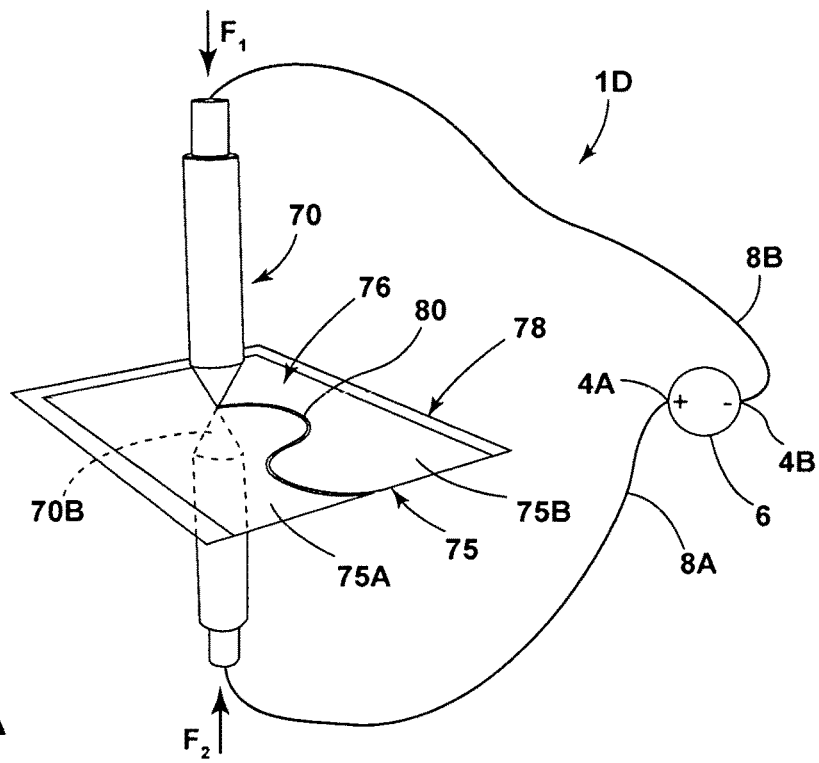
FIG. 9A is a partially schematic isometric view of a cutting mechanism in which movable point contacts score a polymer layer of a composite sheet and act as electrodes.
Figure 9B:
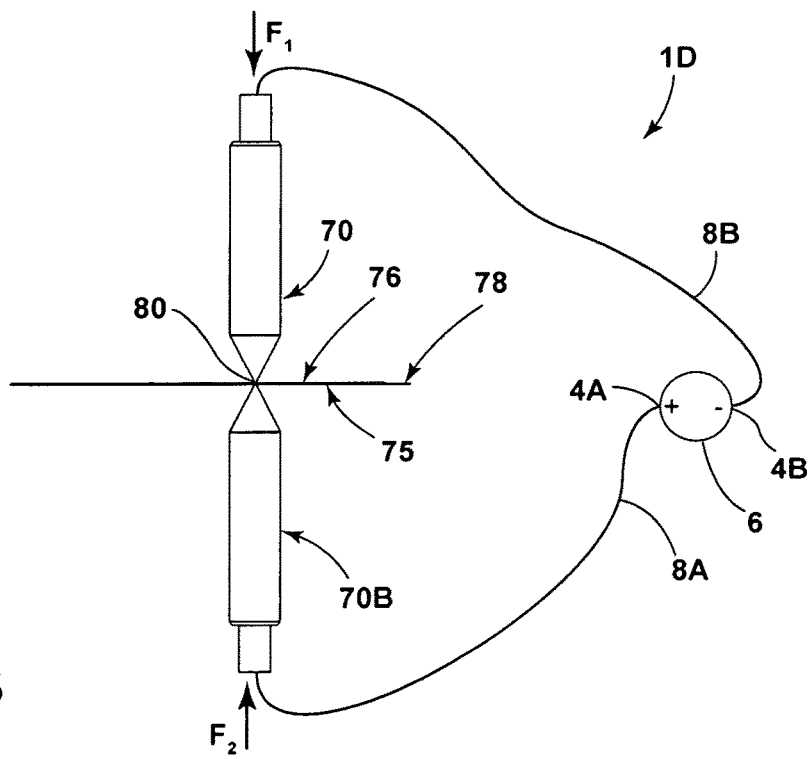
FIG. 9B is a partially schematic side elevational view of the cutting mechanism of FIG. 9A.

With reference to FIGS. 9A and 9B, a cutting mechanism 1D according to another aspect of the present disclosure is configured to cut composite sheet or tape material 75. Cutting mechanism 1D includes a movable assembly 70 having blades 70A, 70B that provide a scoring action and an electrode function for cutting the sheet material 75. Sheet 75 may include at least one polymer outer layer or coating 76 and a conductive core 78. Sheet 75 may include a conductive core layer 78 that is sandwiched between two non-conductive polymer outer layers. Alternatively, sheet 75 may comprise an electrically conductive layer of polymer and conductive reinforcement (i.e. composite) without coating layer 76. Sheet 75 may, alternatively, comprise only a conductive reinforcement core layer 78 itself (i.e. a CNT sheet) that does not include a polymer layer. During cutting, sheet 75 passes between the blades/electrodes 76, 78 and mechanical forces (F1 and F2) are applied to push the blades/electrodes 70A, 70B toward each other, thereby degrading (cutting) the coating(s) 76. Contact between blades/electrodes 70A, 70B and conductive core 78 causes an electrical current to flow from the electrical power supply 6 through a local region of conductive core 78 between blades 70A, 70B to thereby heat and oxidize the conductive core material in a local region between blades/electrodes to effect a kerf or cut 80. Full separation of the material 75 is achieved by moving the blade/electrode assembly 70 over the sheet/tape 75 to form an elongated kerf. Alternatively, the sheet/tape 75 may be moved and the blade/electrode assembly 70 may be stationary. The effect of the movable blades 70A, 70B is to limit and localize the region in which the electrical current is applied to conductive core 78. In this way, the cut can be achieved using less applied power than conventional cutting processes. Localization of the cutting action also enables patterning of the cuts according to a predefined shape/path.

Figure 10A:
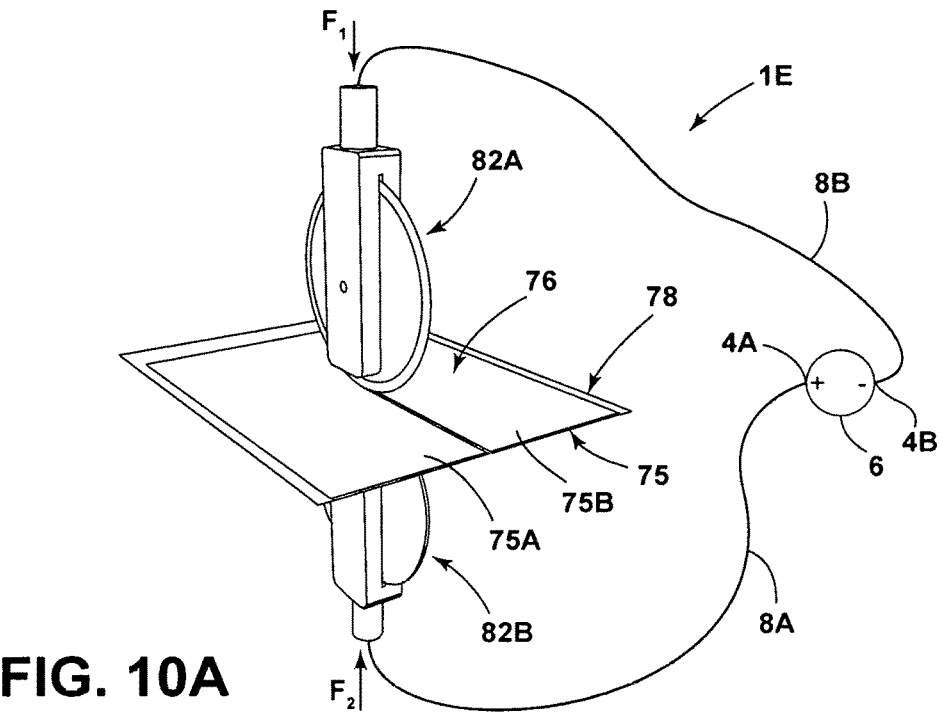
FIG. 10A is a partially schematic isometric view of a cutting mechanism in which movable rotary blades score a sheet and act as electrodes.
Figure 10B:
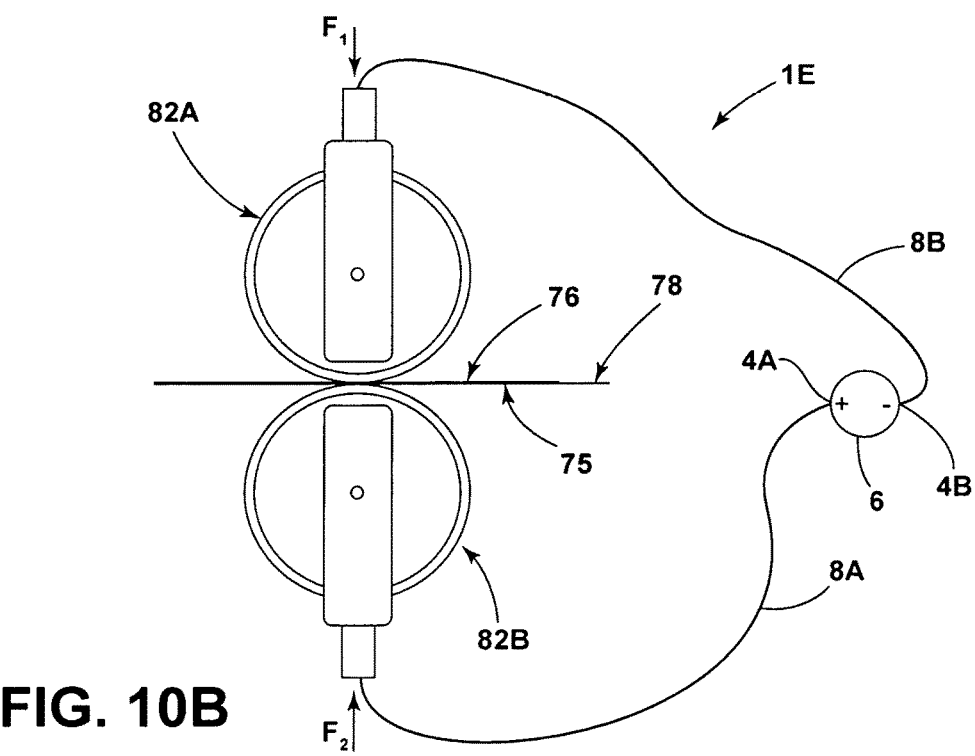
FIG. 10B is a partially schematic side elevational view of the cutting mechanism of FIG. 10A.

With reference to FIGS. 10A and 10B, a cutting mechanism 1E according to another aspect of the present invention includes rotatable circular blades 82A, 82B that are electrically connected to an electrical power supply 6. In use, blades 82A, 82B provide a scoring action and electrode function to cut a sheet 75 having a conductive core 78 itself or, alternatively with one or more non-conductive (e.g. polymer) outer layers 76. As the composite sheet/tape 75 passes between blades/electrodes 82A, 82B, mechanical forces F1 and F2 are applied by one or more powered actuators such as electrical motors (not shown) to push the rotating blades 82A, 82B toward each other. This causes scoring (cutting) of the coatings 75 such that rotating blades/electrodes 82A, 82B contact conductive core 78. This contact causes an electrical current to flow from the power supply 6 and effect a cut 80 due to heating/ablation of conductive core 78 in a local region between blades 82A, 82B. Full separation of the material 75 into pieces 75A and 75B is achieved by moving the blades/electrodes 82A, 82B over the sheet/tape 75. Alternatively, the sheet/tape 75 can be moved with the blades/electrodes 82A, 82B remaining stationary. The effect of the rotary blades 82A, 82B is to limit and localize the region in which the electrical current is applied and thus achieve a cut 80 utilizing relatively low applied power. Localization of the cutting action also enables patterning of the cuts to be achieved.

Figure 11:
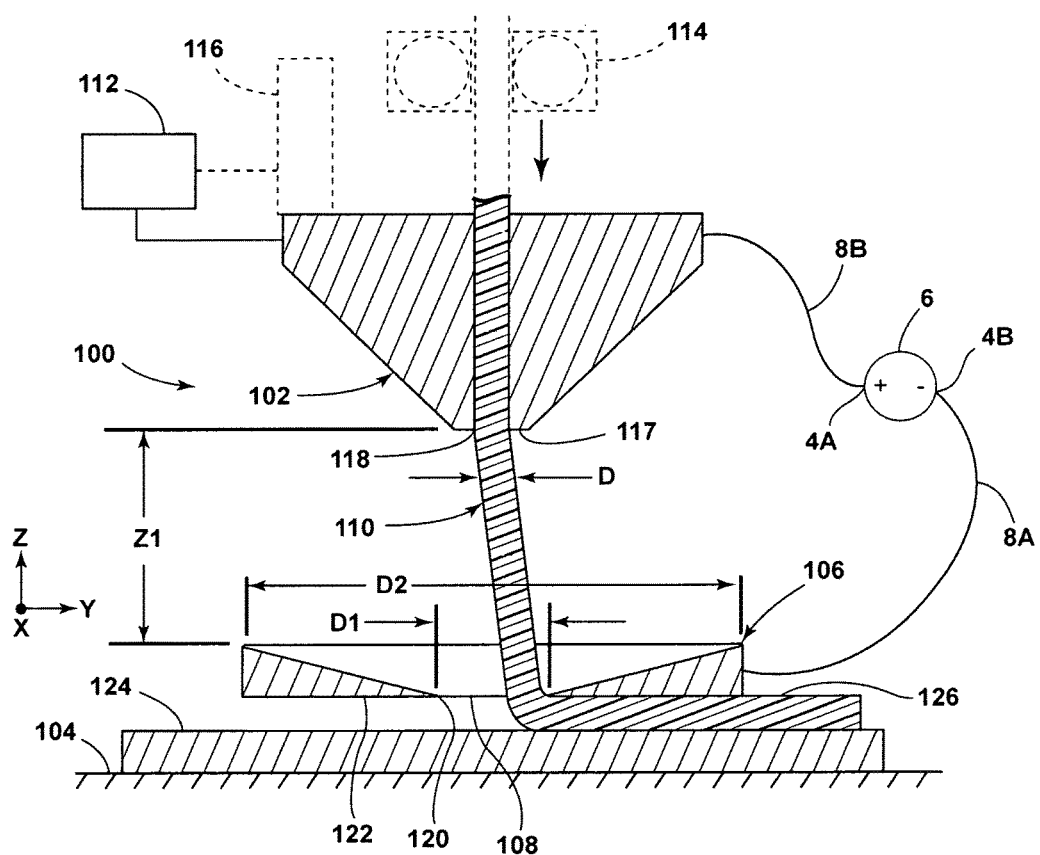
FIG. 11 is a schematic side elevational view of a 3D printer including a cutting mechanism for cutting electrically conductive filaments after deposition, a metallic print nozzle and a conductive plate form electrodes.

With further reference to FIG. 11, a mechanism 100 according to another aspect of the present disclosure comprises a 3D printing device that is configured to cut a filament 110 after the filament 110 exits a nozzle 102 of the printer. Filament 110 may be substantially similar to filament 10 described above, and may include a conductive core and a polymer (e.g. thermoplastic) outer coating. Mechanism 100 may include a nozzle 102 that heats and deposits filament 110 onto a print bed 104 in successive regions or layers to fabricate 3D components. A controller 112 is configured to actuate a feed mechanism 114 to feed the filament 110 through nozzle 102 and through an opening or hole 108 in a plate 106. A powered mechanism 116 is operably connected to controller 112 and moves nozzle 2 in a predefined manner relative to build platform 104 to deposit the filament 110 in a specific sequence/location as required to print a 3D component. 3D printing devices having movable nozzles, feed mechanism, controllers, and powered mechanisms to control movement of a nozzle are generally known in the art. However, in contrast to known 3D printing devices, mechanism 100 is configured to cut fiber 110 at the point of extrusion. Nozzle 102 and plate 106 are electrically conductive (e.g. metal) and act as blades/electrodes. Mechanism 100 may be used for laying down (depositing) electrically conductive filament 110 in a 3D printing process in which the filament 110 is cut in the region between nozzle 102 and plate 106 after printing. Cutting after printing permits more accurate prints by controlling the exact point of filament separation in relation to the filament's actual position on the print bed 104, rather than using a predetermined length that is cut prior to printing.

The nozzle 102 is made of an electrically conductive material (e.g. metal) and forms a first electrode. Outlet opening 118 of nozzle 102 has an outlet diameter that is greater than or equal to the diameter of the filament 110. Plate 106 is also made of an electrically conductive material (e.g. metal), and forms a second electrode. Electrical current is supplied via an electrical power supply 6 that is connected to the electrodes 102, 106. Hole 108 in plate 106 has a minimum diameter "D1" that is greater than a diameter "D" of the filament 110. Hole 108 forms a sharp edge 120 at a bottom 122 of the plate 106. Mechanism 100 is configured so that the nozzle outlet 118 and hole 108 in plate 106 are concentric with the larger diameter D2 of the hole 108 in plate 106 facing the nozzle outlet 118. This allows for cutting of filament 110 to take place regardless of the last printing move direction. Additionally, a vertical distance Z1 between the nozzle 102 and plate 106 is adjustable to thereby adjust a length of filament 110 through which electrical current flows during the cutting operation. The vertical position of nozzle 102 relative to plate 106 can be adjusted such that a lower portion of nozzle 102 is received in hole 108 of plate 106 with lower end 117 of nozzle 102 protruding below lower surface 122 of plate 106.

In use, an end 126 of the filament 110 is first anchored to build platform 104 by applying a force on filament 110 using the plate 106 or lower end 117 of nozzle 102 to clamp an end 126 of filament 110 between plate 106 or lower end 117 of nozzle 102 and a printing substrate 124 on build platform 104. It will be understood that nozzle 102 may be heated to soften/melt the polymer material of filament 110 prior to depositing filament 110 onto build platform 104. During printing, the bottom of plate 106 may be moved a distance Z1 to a position at or above the lower end 117 of nozzle 102. Next, the distance Z1 between the nozzle 102 and plate 106 is adjusted so that nozzle 102 and plate 106 are not touching each other or any other surface which could otherwise cause a short in the circuit, and wherein the bottom 122 of plate 106 is below the lower end 117 of nozzle 102. The filament 110 is then pulled taut by feed mechanism 114 and/or by actuating (moving) the nozzle 102 in the X and/or Y direction relative to the build platform 104 while clamping the filament 110 (e.g. yarn) in place using the feed mechanism 114. Feed mechanism 114 may comprise a standard component of known 3D printers. The tension on filament 110 ensures that good electrical contact is made between the conductive portion (core) of filament 110 and the nozzle 102, as well as between the filament 110 and edge 120 of plate 106. Electrical current is then supplied to the filament 110 by electrical power source 6 until filament 10 is cut due to oxidation of conductive carbon material and/or melting of polymer material of filament 110. Greater tension on the filament 110 may be provided by keeping filament 110 taut to provide a better connection, thereby reducing the overall resistance of the circuit and allowing for faster cutting. Also, the angles of the filament 110 at each electrode 102, 106 may be adjusted by varying the distance Z1 between the nozzle 102 and the flat plate 106. This adjustment provides control over the location of the cut (separation) during cutting. If the filament angle at the plate 106 is less than the angle at the nozzle 102 (as shown in FIG. 11), separation will typically occur closer to (or at) the plate 106.

Figure 12A:
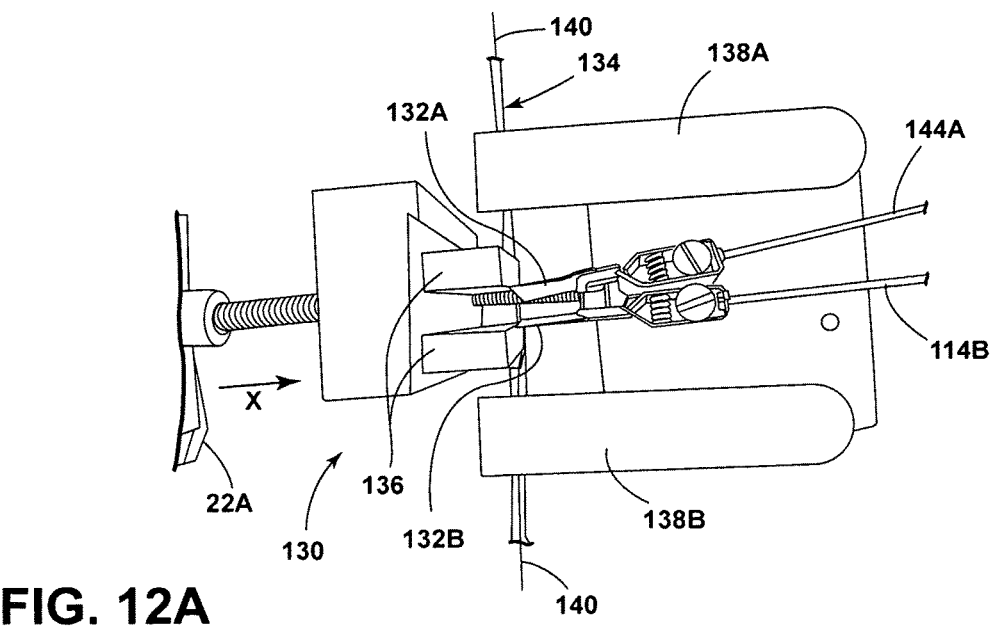
FIG. 12A is a partially fragmentary perspective view of a prototype cutting mechanism.
Figure 12B:
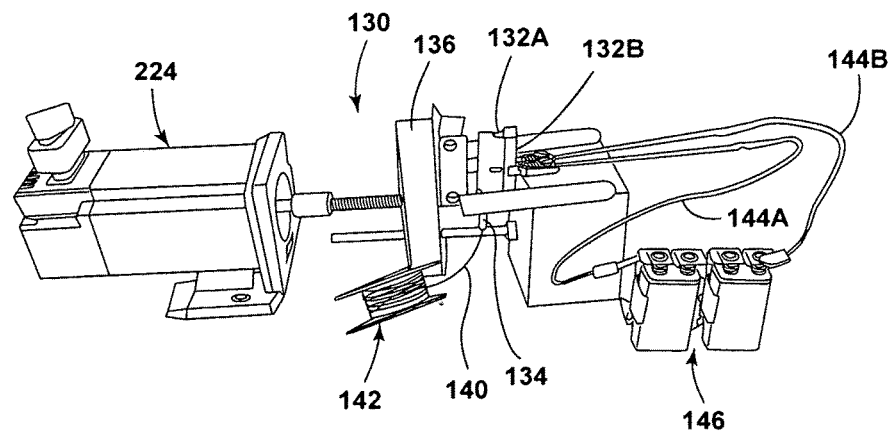
FIG. 12B is a perspective view of the cutting mechanism of FIG. 12A.

FIGS. 12A and 12B show a test cutting mechanism 130 utilized to test cutting of filaments. Blades/electrodes 132A, 132B of test mechanism 130 comprise laboratory razor blades that are positioned adjacent to each. Blades 132A, 132B are connected to batteries 146 by wires 144A, 144B. Batteries 146 may comprise two general purpose 9V batteries that provide a sharp current spike during cutting. Teflon tubing 134 is mounted to supports 138A, 138B. Teflon tubing 134 guides filament 140 from a spool 142. An electrical stepper motor 22A drives a support 136 towards blades 132A, 132B in the direction "X" to cut filament 140.

Figure 13A:
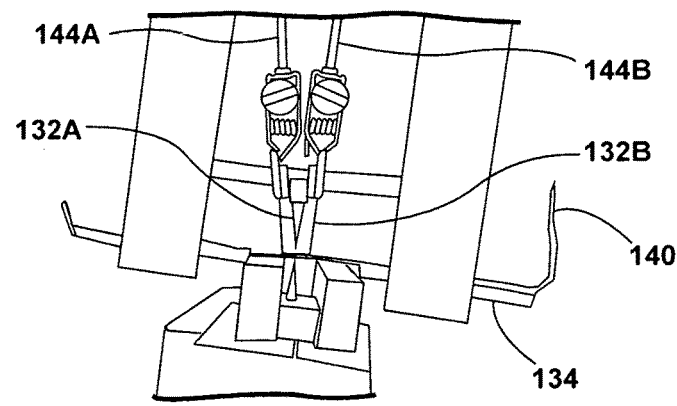
FIG. 13A is a perspective view showing initial cutting action for the prototype cutting mechanism of FIGS. 12A and 12B.
Figure 13B:
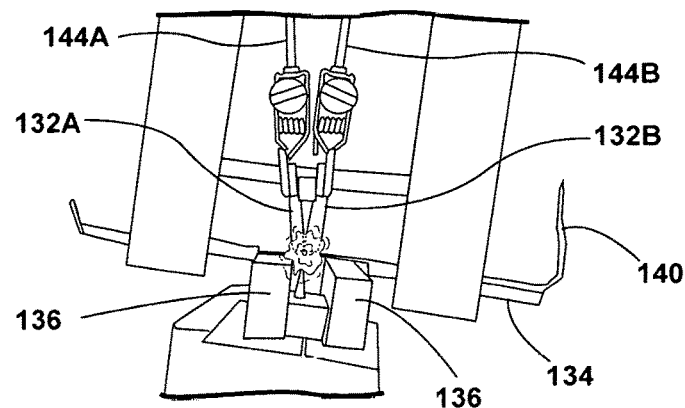
FIG. 13B is an isometric view showing heating/ablation of the filament during the cutting operation.
Figure 13C:
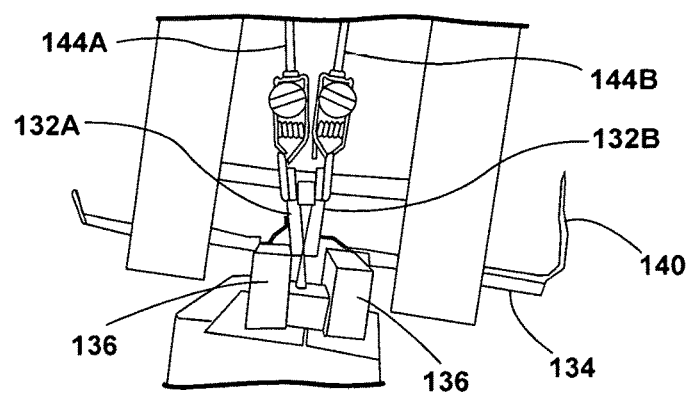
FIG. 13C is an isometric view showing the cut filament in the prototype cutting mechanism of FIGS. 12A and 12B.

Operation of test cutting mechanism 130 is shown in FIGS. 13A-13C. In the test, the filament 140 comprised high strength carbon nanotube yarn (Nanocomp Technologies Inc.) coated with Ultem (polyetherimide), a high performance polymer having high glass transition temperature and strength. The blades/electrodes 132A, 132D are initially brought into contact with filament 140 with no electrical current flowing (FIG. 13A). Additional movement of the blades/electrodes 132A, 132B causes scoring of the polymer coating, and the blades 132A, 132B come into contact with the electrically conductive reinforcement fiber of filament 140. This causes an electrical circuit to be completed, leading to electric current flowing through the conductive fiber of filament 140. The electrical current causes rapid heating and oxidation of both the conductive reinforcement fiber and the resin coating in the region between the electrodes (FIG. 13B). In a short time, a clean cut is created and the current drops to zero (FIG. 13C).

Figure 14:
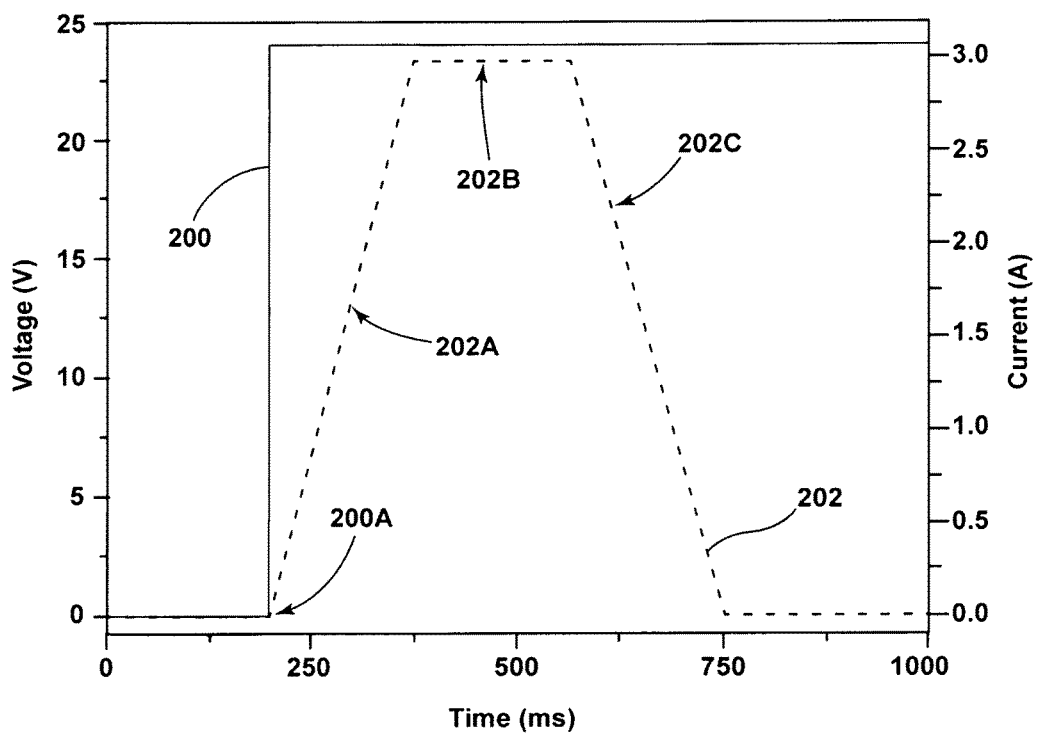
FIG. 14 is a graph showing current-voltage profile during a cutting operation.

FIG. 14 shows a current-voltage profile during a cutting operation. To effect the cutting action, the source voltage 200 is turned on at 200A. This causes the current 202 to rise from 0 at 202A to a maximum at 202B as it flows through the filament that is to be cut. This current causes heating of the filament. Upon severing of the heated filament, the current falls as shown at 202C. The rise and fall of the current (202A-202C) or correspondingly, the changes in the voltage across the filament (not shown), is an indicator of the starting and completion of the cutting action. This indication can be used as part of a feedback control process that determines when cuts have been successfully effected.

While the preferred embodiments of the invention have been disclosed in detail it is to be understood that the invention is not limited to the disclosed embodiments. Many changes and modifications within the spirit of the invention can be made by those skilled in the art. Such modifications and changes are considered to fall within the scope of the appended claims.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other. Each range disclosed herein constitutes a disclosure of any point or sub-range lying within the disclosed range.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." As used herein, the term "and/or" includes any and all combinations of one or more of the associated listed items. As also used herein, the term "combinations thereof" includes combinations having at least one of the associated listed items, wherein the combination can further include additional, like non-listed items. Further, the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

Reference throughout the specification to "another embodiment", "an embodiment", "exemplary embodiments", and so forth, means that a particular element (e.g., feature, structure, and/or characteristic) described in connection with the embodiment is included in at least one embodiment described herein, and can or cannot be present in other embodiments. In addition, it is to be understood that the described elements can be combined in any suitable manner in the various embodiments and are not limited to the specific combination in which they are discussed.

What is claimed is:

1. A method of cutting filaments comprising a conductive inner portion and outer portion disposed around the conductive inner portion, the method comprising:
   providing first and second conductive electrodes, wherein both the first and second conductive electrodes comprise a blade having an edge configured to mechanically cut into the outer portion;
   providing a voltage difference across the first and second conductive electrodes;
   bringing the first and second conductive electrodes into contact with the outer portion;
   applying force to the first and second conductive electrodes to thereby cause the first and second conductive electrodes to penetrate the outer portion and contact the conductive inner portion without mechanically cutting through the conductive inner portion, wherein the first and second conductive electrodes contact the conductive inner portion such that an electrical current flows through a local region of the conductive inner portion between the first and second conductive electrodes and degrades the conductive inner portion at the local region by oxidation to thereby cut the filament and stop the electrical current flow,
   wherein the conductive inner portion comprises carbon.

2. The method of claim 1, wherein:
the conductive inner portion has electrical resistance and the electrical current heats the local region of the conductive inner portion.

3. The method of claim 1, wherein:
the filament comprises a carbon nanotube reinforced composite filament.

4. The method of claim 1, including: utilizing a powered actuator to apply a force to move a support block to thereby move the filament toward the first and second conductive electrodes and apply the force to penetrate the outer portion and contact the conductive inner portion without mechanically cutting through the conductive inner portion.

5. The method of claim 1, including:
manually applying a force to a support block to thereby move the filament toward the first and second conductive electrodes and apply the force to penetrate the outer portion and contact the conductive inner portion without mechanically cutting through the conductive inner portion.

6. The method of claim 1, wherein:
the first and second conductive electrodes comprise spaced-apart blades that contact the filament at spaced-apart locations along the length of the filament.

7. The method of claim 1, wherein:
the first and second conductive electrodes comprise blades having edges that are initially positioned on opposite sides of the filament and move toward each other during the cutting process.

8. The method of claim 1, wherein:
the first electrode comprises an electrically conductive print nozzle of a 3D printing mechanism;
the second electrode comprises an electrically conductive member that is spaced-apart from the print nozzle; and
the method further comprises:
feeding the filament from the print nozzle and depositing a portion of the filament onto a substrate through the electrically conductive member; and
compacting the filament onto the substrate using the electrically conductive member, wherein applying force to the first and second conductive electrodes to thereby cause the first and second conductive electrodes to penetrate the outer portion and contact the conductive inner portion without mechanically cutting through the conductive inner portion comprises pulling the filament taut between the print nozzle and the electrically conductive member after compacting the filament such that the print nozzle and the electrically conductive member penetrate the outer portion and contact the conductive inner portion without mechanically cutting through the conductive inner portion; and
causing electrical current to flow through the print nozzle and the electrically conductive member to thereby cut the filament between the print nozzle and the electrically conductive member after pulling the filament taut.

9. The method of claim 1, including:
monitoring the current flowing through the filament and/or the voltage across the filament to generate data; and
utilizing the data to provide control of the cutting process.

10. The method of claim 1, wherein the electrical current is less than 3 amps and flows for less than 750 milliseconds.

11. A method of cutting composite material comprising at least one conductive carbon material in contact with a non-conductive material along a length of the composite material, the method comprising:
bringing first and second conductive electrodes into contact with the non-conductive material of the composite material wherein the first and second conductive electrodes include scoring blades;
applying a force to the first and second conductive electrodes to mechanically cut into the non-conductive material until the first and second electrodes contact the conductive carbon material without mechanically cutting through the conductive carbon material;
providing a voltage difference across the first and second electrodes to cause electrical current to flow through and oxidize the conductive carbon material to thereby degrade and cut the composite material and stop the flow of electrical current.

12. The method of claim 11, wherein:
the composite material is formed as a sheet comprising at least one layer that is conductive and at least one layer of material that is non-conductive.

13. The method of claim 11, wherein:
the composite material includes layers of non-conductive material on opposite sides of the conductive carbon material; and
wherein the first and second electrodes contacting the conductive carbon material includes the first and second electrodes contacting opposite sides of the conductive carbon material.

14. The method of claim 11, including:
moving the first and second conductive electrodes relative to the composite material to thereby form an elongated kerf in the composite material.

15. The method of claim 11, wherein:
the conductive carbon material comprises carbon nanotubes and/or carbon fibers; and
the composite material is formed as a sheet.

16. The method of claim 11, wherein the electrical current is less than 3 amps and flows for less than 750 milliseconds.

17. The method of claim 11, wherein the blades are rotatable and circular.

* * * * *